United States Patent
Wardlaw et al.

(10) Patent No.: US 9,849,656 B2
(45) Date of Patent: Dec. 26, 2017

(54) METHOD OF REPAIRING A CORE STIFFENED STRUCTURE

(71) Applicant: Bell Helicopter Textron Inc., Fort Worth, TX (US)

(72) Inventors: Robert Wardlaw, Keller, TX (US); Brian S. Modrzejewski, Keller, TX (US); Byron Mueller, Azle, TX (US); Vance N. Cribb, III, Aledo, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 443 days.

(21) Appl. No.: 14/512,837

(22) Filed: Oct. 13, 2014

(65) Prior Publication Data
US 2016/0101878 A1 Apr. 14, 2016

(51) Int. Cl.
*B64F 5/40* (2017.01)
*B32B 38/00* (2006.01)
*B64C 27/473* (2006.01)
*B32B 43/00* (2006.01)
*B32B 37/24* (2006.01)
*B29C 73/06* (2006.01)
*B29C 44/12* (2006.01)
*B29C 44/18* (2006.01)
(Continued)

(52) U.S. Cl.
CPC ...... *B32B 38/0004* (2013.01); *B29C 44/1285* (2013.01); *B29C 44/18* (2013.01); *B29C 73/06* (2013.01); *B32B 37/24* (2013.01); *B32B 43/00* (2013.01); *B64C 27/473* (2013.01); *B64F 5/40* (2017.01); *B29C 73/10* (2013.01); *B29C 2073/264* (2013.01); *B29L 2031/082* (2013.01); *B29L 2031/608* (2013.01); *B32B 2037/243* (2013.01); *B32B 2038/0076* (2013.01); *B32B 2038/0084* (2013.01); *B32B 2305/022* (2013.01); *B32B 2305/024* (2013.01); *B32B 2305/72* (2013.01); *B32B 2603/00* (2013.01)

(58) Field of Classification Search
CPC ... B64F 5/0081; B29C 44/1285; B29C 44/18; B29C 73/06; B29C 73/063; B29C 73/10; B32B 37/12–37/1292; B32B 343/00; B64C 27/473; B64C 27/4733; B64C 27/4736
See application file for complete search history.

(56) References Cited

U.S. PATENT DOCUMENTS 3,765,124 A * 10/1973 Ferris ............... B64C 27/473
416/226
2009/0269547 A1 10/2009 Meyer
2012/0114897 A1* 5/2012 Thiagarajan ........ B29C 44/025
428/71

FOREIGN PATENT DOCUMENTS

EP 1870228 A1 12/2007

OTHER PUBLICATIONS

Military Handbook 337, Adhesive Bonded Aerospace Structure Repair, Dec. 1982.*

(Continued)

*Primary Examiner* — Woody Lee, Jr.
*Assistant Examiner* — Brian O Peters
(74) *Attorney, Agent, or Firm* — Timmer Law Group, PLLC (57) ABSTRACT

A method of repairing a core stiffened structure, including removing a damaged portion of the core stiffened structure; bonding a shelf onto a first core member; bonding a second core member to a shelf; and securing a skin patch over the second core member.

11 Claims, 7 Drawing Sheets

(51) Int. Cl.
    *B29C 73/26*       (2006.01)
    *B29C 73/10*       (2006.01)
    *B29L 31/60*       (2006.01)
    *B29L 31/08*       (2006.01)

(56) References Cited

OTHER PUBLICATIONS

European Search Report in related European Patent Application No. 14192418.3, dated Apr. 17, 2015, 3 pages.
Bitzer, Tom, Honeycomb Technology, Materials, Design, Manufacturing, Applications, and Testing, Jan. 1, 1997, pp. 193-199, Chapman and Hall, GB.
European Examination Report in related European Patent Application No. 14192418.3, dated Apr. 29, 2015, 5 pages.

* cited by examiner

METHOD OF REPAIRING A CORE STIFFENED STRUCTURE

BACKGROUND

Technical Field

The embodiments of the present disclosure relate to the repair of a core stiffened structure.

Description of Related Art

In a conventional repair process, a damaged core stiffened structure is repaired by removing the damaged core and replacing with expandable foam. Such a repair process has certain benefits; however, one shortcoming is that the structure is not brought back to its original full bearing strength, especially in shear. There is a need for an improved method of repairing a core stiffened structure, especially core stiffened structures that are highly strained members, such as a rotor blade structure for example.

DESCRIPTION OF THE DRAWINGS

The novel features believed characteristic of the methods and apparatuses of the present disclosure are set forth in the appended claims. However, each method and apparatus, as well as a preferred mode of use, and further objectives and advantages thereof, will best be understood by reference to the following detailed description when read in conjunction with the accompanying drawings, wherein:

DETAILED DESCRIPTION

Illustrative embodiments of the methods and apparatuses are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
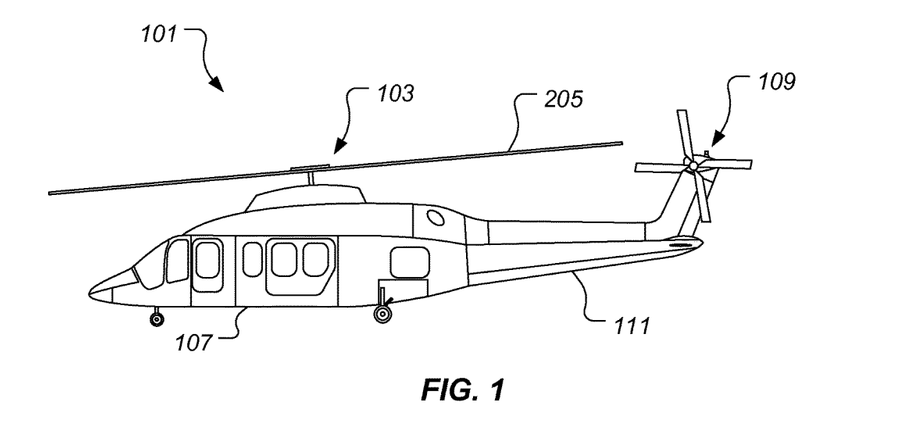
FIG. 1 is a side view of a rotorcraft according to one example embodiment.

Referring now to FIG. 1 in the drawings, a rotorcraft 101 is illustrated. Rotorcraft 101 has a rotor system 103 with a plurality of rotor blades 205. The pitch of each rotor blade 205 can be manipulated in order to selectively control direction, thrust, and lift of rotorcraft 101. Rotorcraft 101 can further include a fuselage 107, anti-torque system 109, and an empennage 111. A variety of members on rotorcraft 101 can be manufacturing as a core (honeycomb, foam, or honeycomb/foam, for example) stiffened structure, as discussed further herein.

Rotorcraft 101 is merely illustrative of the wide variety of aircraft and vehicles that are particularly well suited to take advantage of the repair method of the present disclosure. It should be appreciated that other types of aircraft can also utilize the repair method of the present disclosure. Further, utilization of the repair method of the present disclosure is not restricted to use of repairing core stiffened structures for aircraft.

Figure 2:
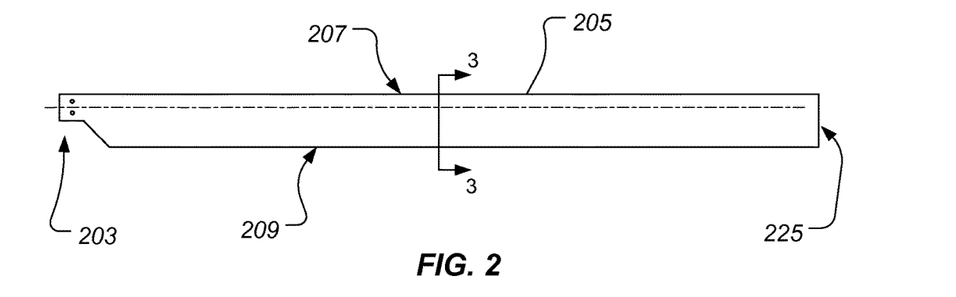
FIG. 2 is a top view of a rotor blade, according to one example embodiment.
Figure 3:
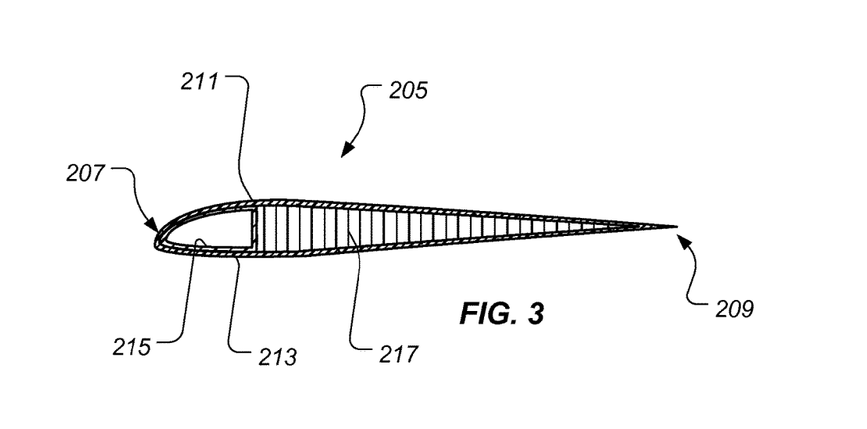
FIG. 3 is a cross-sectional view of a rotor blade taken from section lines 3-3 in FIG. 2, according to one example embodiment.

Referring now also to FIGS. 2 and 3, rotor blade 205 is an example of a rotorcraft member than can be configured with core to efficiently provide strength and stiffness. Rotor blade 205 can include a leading edge portion 207, a trailing edge portion 209, a root end portion 203, and a tip end portion 225. In the illustrated embodiment, an upper skin 211 and a lower skin 213 form an aerodynamic surface with a spar member 215 and a core member 217 forming the internal structure. Rotor blade 205 is merely illustrative of the wide variety of core stiffened structures that can utilize one or more methods disclosed herein. In another embodiment, a horizontal stabilizer is the core stiffened structure, for example.

Figure 4:
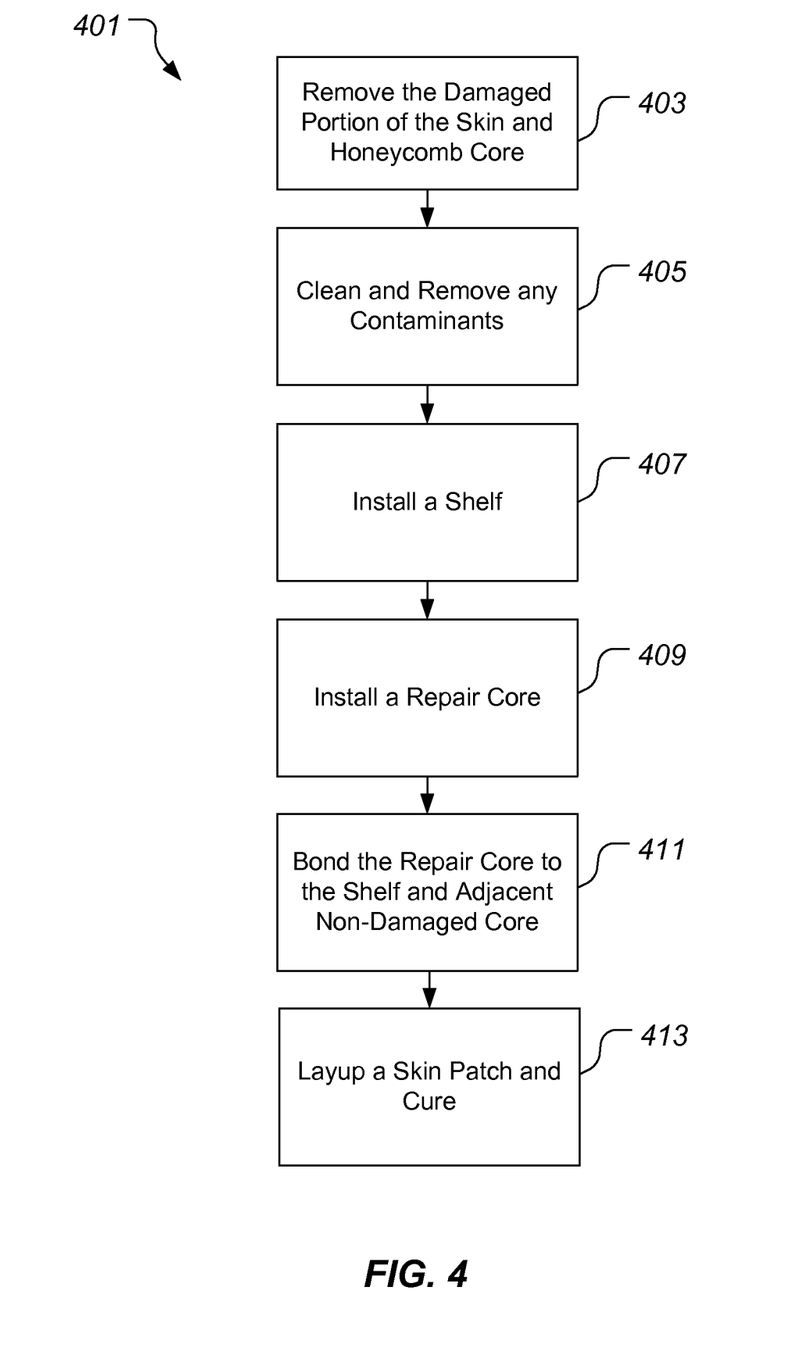
FIG. 4 is a schematic view of a method of repairing a core stiffened structure, according to an example embodiment.

Referring now to FIG. 4, a method 401 of repairing a core stiffened structure is schematically illustrated. During operation of rotorcraft 101, damage to a core stiffened structure can occur in a variety of scenarios, such as a collision with an object during flight, battle damage, or from ground personnel while the aircraft is on the ground, to name a few examples. In order to ensure safety of the aircraft, the damaged portion of the core stiffened structure must be repaired. It should be appreciated that the damage can exist in the skin and/or the core. However, removal of the damaged skin may also require repair of the core since the skin and the core are bonded together. For illustrative purposes, method 401 is illustrated and described herein with regard to repair of rotor blade 205; however, it should be appreciated that method 401 can be performed on any core stiffened structure.

Figure 5:
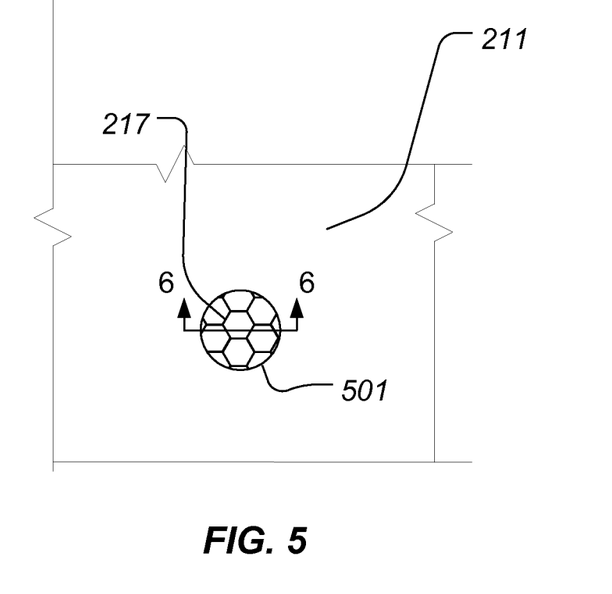
FIG. 5 is a top view of a portion of a rotor blade during the repair process, according to an example embodiment.
Figure 6:
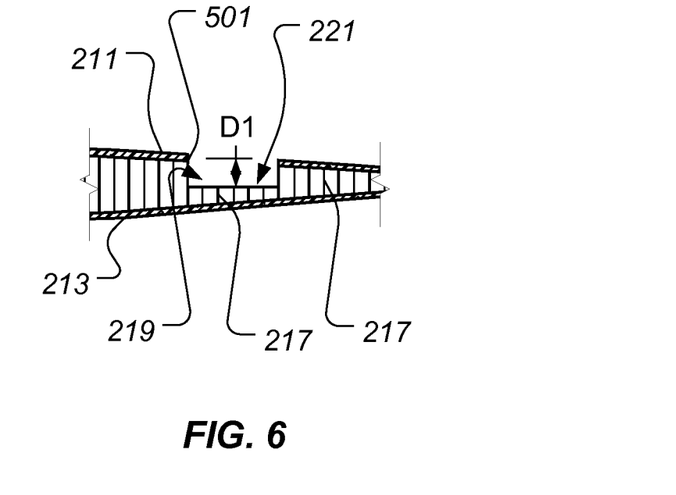
FIG. 6 is a cross-sectional view of the rotor blade taken from section lines 6-6 in FIG. 5, according to an example embodiment.

Method 401 can include a step 403 of removing the damaged portion of skin, such as upper skin 211, and the damaged portion of core, such as core member 217. Referring also to FIGS. 5 and 6, step 403 is illustrated in further detail. FIG. 5 shows the damaged portion of skin 211 removed by a cutout 501, which in the illustrated embodiment is circular; however, it should be appreciated that the cutout can be any implementation specific shape. Further, FIG. 6 illustrates that the damaged core portion is removed to form a cavity 219 to a depth D1 until a relatively planar surface 221 is obtained with non-damaged core 217 remaining therebelow. Removal of the damaged skin portion and the damaged core portion can be performed with a saw or machining head, for example.

Method 401 can further include a step 405 for cleaning and removing any contaminants in and around cavity 219. Step 405 can include using a cleaning solution, such as an alcohol based fluid to remove contaminants.

Figure 7:
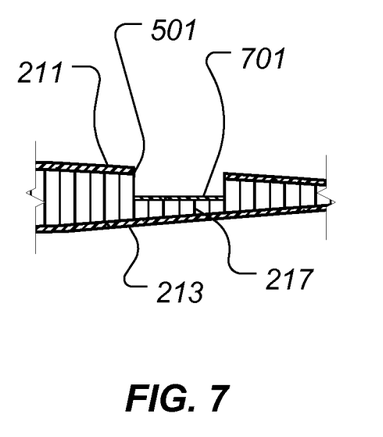
FIG. 7 is a cross-sectional view of the rotor during the repair process, according to an example embodiment.

Method 401 can include a step 407 of installing a shelf 701 onto the surface 221 of the remaining non-damaged core 217. Referring now also to FIG. 7, one example embodiment of step 407 is illustrated. In one example embodiment, shelf 701 is a pre-cured composite that is adhesively bonded onto non-damaged core 217. For example, a film adhesive can be used to bond the lower surface of the shelf 701 to the upper surface network of the non-damaged core 217. The adhesive is cured using the requisite curing instructions. In another example embodiment, the shelf 701 is installed onto non-damaged core 217 as an uncured composite layup. In such an embodiment, the uncured composite layup can be cured concurrently with an adhesive that may be used to bond the shelf 701 to the non-damaged core 217.

Figure 11:
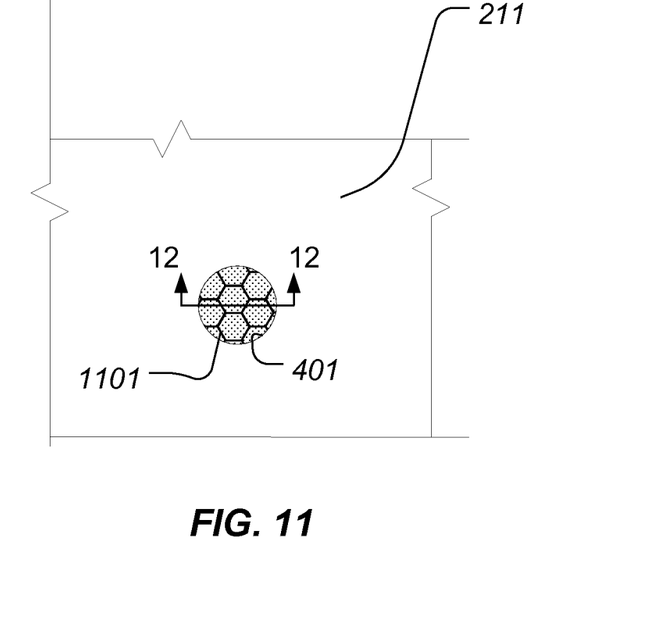
FIG. 11 is a top view of a portion of a rotor blade during the repair process, according to an example embodiment.
Figure 12:
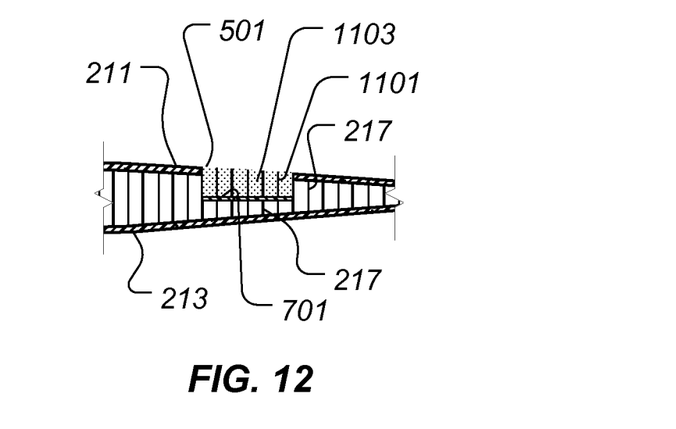
FIG. 12 is a cross-sectional view of the rotor blade, taken from section lines 12-12 in FIG. 11, according to an example embodiment.

Method 401 can further include a step 409 of installing a repair core 1101 and a step 411 of bonding the repair core 1101 to the shelf 701 and adjacent non-damaged core 217. Referring also to FIGS. 11 and 12, steps 409 and 411 are illustrated in further detail. Repair core 1101 is sized to fit within the cavity 219 created by removal of the damaged skin and damaged core portions. The periphery of repair core 1101 preferably is in close proximity or is in contact with the adjacent non-damaged core 217. In one example embodiment, the step 411 of bonding the repair core 1101 to the shelf 701 and adjacent non-damaged core 217 includes pouring a urethane foam system into the interior cells and any outer peripheral partial cells so as to bond the repair core 1101 to the shelf 701 and adjacent non-damaged core 217. In an alternative embodiment, a film, foam, or paste adhesive can be used to bond the repair core 1101 to the shelf 701 and adjacent non-damaged core 217. In such an embodiment, the paste adhesive, foam adhesive, or film adhesive would be located in between the adjoining portions of the repair core and the non-damage core, as well as between the lower surface network of the repair core 1101 and the upper surface of the shelf 701. The process for utilizing a urethane foam system to bond the repair core 1101 to the shelf 701 and the adjacent non-damaged core 217 is described further with reference to FIGS. 8-10.

Figure 8:
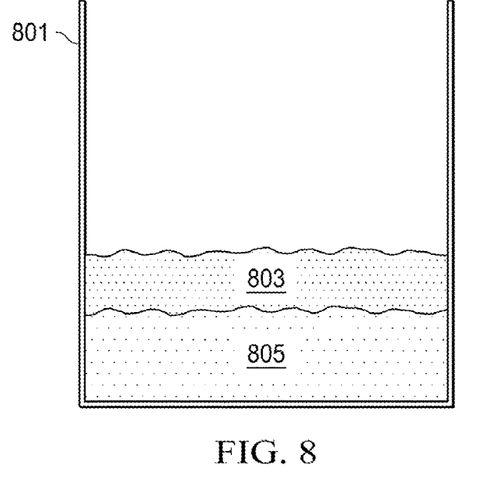
FIG. 8 is a stylized view of components of the foam system, according to an example embodiment.
Figure 9:
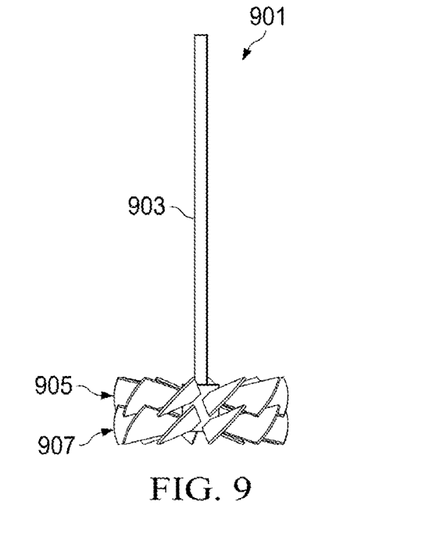
FIG. 9 is a front view of a mixer used to mix the foam system, according to an example embodiment.
Figure 10:
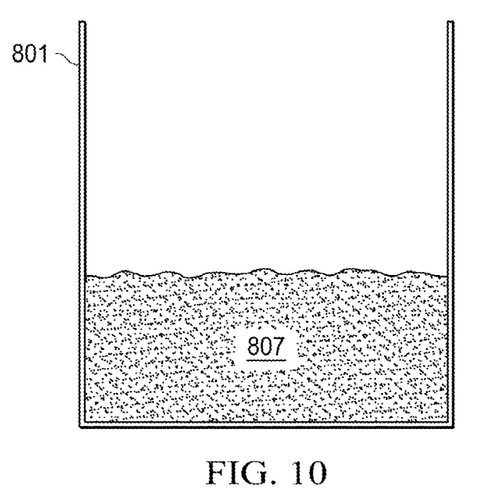
FIG. 10 is a stylized view of a mixture of the foam system, according to an example embodiment.

Referring now also to FIGS. 8-10, the foam system used in one embodiment of method 401 is preferably a pourable urethane foam system that expands to fill and bond together the repair core, such as repair core 1101, and non-damaged core 217. Upon curing, the foam is rigid enough to transfer load but is compliant so that stress concentrations are not generated, while having a relatively low density, or a density similar to the core. In the illustrated embodiment, the foam system is a polyisocyanurate pour foam system marketed under the name of Stepanfoam BX 450, by the Stepan Chemical Company. It should be fully appreciated that other foam systems may be used. The Stepanfoam BX 450 includes two separate resin components, namely a resin T (70% by weight) 805 and a resin R (30% by weight) 803. The desired weight amounts of resin T 805 and resin R 803 are measured and poured into a container 801. The resin T 805 and resin R 803 are mechanically agitated to form a homogenous mixture 807. A mixer 901 can be used in rotation in order to mix resin T 805 and resin R 803 to form mixture 807. Mixer 901 includes a shaft 903, the shaft 903 being configured to be driven by a drill motor, or the like. Mixer 901 may include a plurality of blades located on a first blade disc 905 and a second blade disc 907. In the illustrated embodiment, mixer 901 is rotated at 3500 revolutions per minute for 10-15 seconds when mixing resin T 805 and resin R 803 to form mixture 807.

Step 411 of method 401 can include pouring foam mixture 807 into the repair area. Once the mixing in is complete, it is preferred that mixture 807 is poured into the repair area as quickly as possible. Once foam mixture 807 is poured into cavity 219, foam mixture 807 is allowed to expand and fill the voids so as to form an expanded foam 1103, which for illustrative purposes is shown in FIGS. 11 and 12. In the illustrated embodiment, the foam mixture 807 is allowed to "free rise"; however, an alternative embodiment can include restricting the expansion by placing an upper mold over the repair area. Preferably, the upper mold would include an opening that allows the release of outgases. The expanded foam 1103 functions to bond the repair core 1101, the shelf 701, and the non-damaged core 217 together.

The step 411 can also include trimming the expanded foam 1103 after foam mixture 807 has fully expanded and has become semi-rigid. Trimming the expanded foam 1103 includes reducing the outer surface to correspond approximately with the outer airfoil surface of skin 211. The trimming of expanded foam 1103 can be performed by any variety of processes, such as a cutting, sanding, machining, to name a few examples. FIG. 12 is an illustration of expanded foam 1103 trimmed such that the outer surface corresponds approximately to the outer airfoil surface of skin 211.

Figure 13:
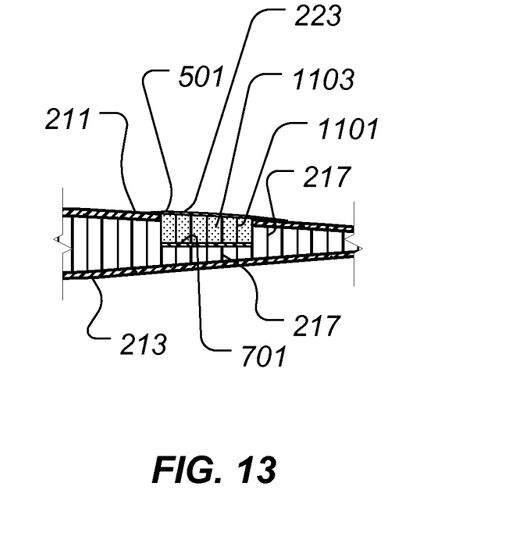
FIG. 13 is a cross-section view of the rotor blade with a skin patch installed, according to an example embodiment.

A step 413 includes laying up a composite skin patch 223 on the expanded foam 1103 and the upper surface network of the repair core 1101, and subsequently curing the repair assembly. An illustrative composite skin patch 223 is shown in FIG. 13. In the illustrated embodiment, composite skin patch 223 is a plurality of plies of composite fibers with resin (i.e. pre-preg). Composite skin patch 223 can be laid directly onto the outer surface of expanded foam 1103 and the upper surface network of the repair core 1101. Composite skin patch 223 and expanded foam 1103 are allowed to cure. In the illustrated embodiment, the curing of composite skin patch 223 and expanded foam 1103 takes place at room temperature, such that an artificial heat source is not required. In another embodiment, skin patch 223 can be a precured composite skin patch or of another rigid material, such as a metal skin patch. In such an embodiment, the rigid skin patch can be adhesively bonded to the expanded foam 1103 with an adhesive.

Method 401, as described further herein, includes significant advantages over conventional repair methods. For example, method 401 does not require special repair tooling that would otherwise be required to separately lay-up and cure a composite patch. Further, method 401 can be performed in the field such that repairs to composite core stiffened structures do not have to be performed in a facility having specialized equipment. Further, when method 401 is performed on composite core stiffened structure wherein the composite core is large cell core (cells greater than 0.5 inches), the expanded foam 1103 (as trimmed) acts as a tooled surface so as to provide uniform support of the composite skin patch 223 prior and during curing.

Furthermore, repair method 401 regains the original shear strength of the core stiffened structure. Certain core stiffened structures that are highly loaded, such as rotor blades, can require that the core transfer shear load between the upper and lower skins. Shelf 701 not only provides a platform for bonding repair core 1101 to the undamaged core 217 therebelow, but also provides a shear transfer medium between repair core 1101 and the undamaged core 217 therebelow.

It should be appreciated that method 401 can be performed on a wide variety of core-stiffened structures. Further, the core-stiffened structures can have a core member 217 comprising any variety of materials, such as carbon, paper, Nomex®, fiberglass, Kevlar®, plastic, metal, foam, to name a few examples. Further, core member 217 can have cell members of a variety of shapes, such as square, hexagonal, elliptical, round, to name a few examples.

The particular embodiments disclosed above are illustrative only, as the apparatuses and methods may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of repairing a rotor blade, the method comprising:
   removing a damaged portion of the rotor blade to provide a first core member within a cavity of the rotor blade;
   installing an uncured composite shelf onto the first core member in the cavity;
   bonding the uncured composite shelf onto the first core member with an adhesive;
   concurrently curing the uncured composite shelf and the adhesive to form a cured composite shelf bonded to the first core member;
   bonding a second core member having a plurality of cells to the cured composite shelf;
   depositing a foam mixture into a cell of the second core member;
   allowing the foam mixture to expand and fill the plurality of cells in the second core member so as to form an expanded foam;
   trimming the expanded foam; and
   securing a skin patch over the second core member;
   wherein the cured composite shelf provides a shear transfer medium between the first core member and the second core member.

2. The method according to claim 1, wherein the step of removing the damaged portion includes removing a skin portion and a damaged core portion.

3. The method according to claim 1, wherein the step of bonding the uncured composite shelf onto the first core member includes locating the adhesive approximate to a lower surface of the uncured composite shelf and an upper surface network of the first core member.

4. The method according to claim 1, further comprising: curing the skin patch.

5. The method according to claim 1, wherein the step of bonding the second core member to the cured composite shelf also includes depositing a foam mixture into a space between outer cell members of the second core member and adjacent cells walls of the first core member.

6. The method according to claim 1, wherein the skin patch is a composite member.

7. The method according to claim 1, wherein the uncured composite shelf is an uncured composite layup.

8. The method according to claim 1, wherein the step of bonding the second core member to the cured composite shelf also includes applying a foam mixture into a space between outer cell members of the second core member and adjacent cells walls of the first core member.

9. The method according to claim 1, wherein the step of bonding the second core member to the cured composite shelf also includes applying a paste adhesive into a space between outer cell members of the second core member and adjacent cells walls of the first core member.

10. The method according to claim 1, wherein the step of bonding the second core member to the cured composite shelf includes applying a film adhesive between the second core member and an upper surface of the cured composite shelf.

11. The method according to claim 1, wherein the step of bonding the second core member to the cured composite shelf includes applying a foam adhesive between the second core member and an upper surface of the cured composite shelf.

* * * * *